United States Patent
Lei et al.

(10) Patent No.: US 11,039,439 B2
(45) Date of Patent: Jun. 15, 2021

(54) METHOD FOR SELECTING CARRIER SET FOR DEVICE-TO-DEVICE MULTI-CARRIER AGGREGATION AND RELATED DEVICES

(71) Applicant: Yulong Computer Telecommunication Scientific (Shenzhen) Co., Ltd., Guangdong (CN)

(72) Inventors: Yixue Lei, Guangdong (CN); Yunfei Zhang, Guangdong (CN); Mingju Li, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 40 days.

(21) Appl. No.: 16/662,860

(22) Filed: Oct. 24, 2019

(65) Prior Publication Data

US 2020/0092883 A1    Mar. 19, 2020

Related U.S. Application Data

(63) Continuation of application No. PCT/CN2018/074151, filed on Jan. 25, 2018.

(30) Foreign Application Priority Data

Apr. 27, 2017 (CN) .......................... 201710289220.4

(51) Int. Cl.
*H04W 72/04* (2009.01)
*H04L 5/00* (2006.01)

(52) U.S. Cl.
CPC ......... *H04W 72/0453* (2013.01); *H04L 5/001* (2013.01)

(58) Field of Classification Search
CPC .......... H04W 72/0453; H04W 72/0406; H04L 5/001

See application file for complete search history.

(56) References Cited

U.S. PATENT DOCUMENTS

| 2013/0308490 A1 | 11/2013 | Lim et al. |
| 2015/0156693 A1 | 6/2015 | Tabet et al. |
| 2015/0249941 A1 | 9/2015 | Wang et al. |
| 2015/0312923 A1 | 10/2015 | Guo |

(Continued)

FOREIGN PATENT DOCUMENTS

| CN | 103974431 A | 8/2014 |
| CN | 106376082 A | 2/2017 |

(Continued)

OTHER PUBLICATIONS

International search report issued in corresponding International application PCT/CN2018/074151 dated Apr. 13, 2018.

(Continued)

*Primary Examiner* — Diane D Mizrahi (57) ABSTRACT

A device-to-device (D2D) multi-carrier aggregation-based carrier set selection method and a related device are provided. A base station receives reporting information from a terminal, the reporting information comprising multiple carriers measured as meeting a reporting condition by the terminal; the base station selects, according to resource status of the multiple carriers, a carrier set for CA used for D2D communication of the terminal. The implementations of the disclosure also disclose a related device.

20 Claims, 3 Drawing Sheets

(56) References Cited

U.S. PATENT DOCUMENTS

2016/0262155 A1    9/2016  Lindoff et al.
2020/0059841 A1*   2/2020  Zhang .................. H04W 36/22

FOREIGN PATENT DOCUMENTS

| CN | 106465384 A  | 2/2017  |
|----|--------------|---------|
| CN | 107124770 A  | 9/2017  |
| EP | 3057368 A1   | 8/2016  |
| WO | 2013068788 A1| 5/2013  |
| WO | 2013169699 A1| 11/2013 |

OTHER PUBLICATIONS

"Synchronization Signals and Channel Design for D2D Discovery and Communication", Ericsson, 3GPP TSG RAN WG1 Meeting #75 R1-135804, section 3, and table.
Extended European Search Report for EP Application 18791551.7 dated Nov. 25, 2020.

* cited by examiner

METHOD FOR SELECTING CARRIER SET FOR DEVICE-TO-DEVICE MULTI-CARRIER AGGREGATION AND RELATED DEVICES

CROSS-REFERENCE TO RELATED APPLICATION(S)

This application is a continuation of PCT application No. PCT/CN2018/074151, filed on Jan. 25, 2018, which claims priority to Chinese Patent Application No. 201710289220.4, filed on Apr. 27, 2017, the disclosures of both of which are hereby incorporated by reference in their entireties.

TECHNICAL FIELD

The present disclosure relates to the technical field of wireless communication, and more particularly to a method for selecting a carrier set for device-to-device multi-carrier aggregation and related devices.

BACKGROUND

Figure 1:
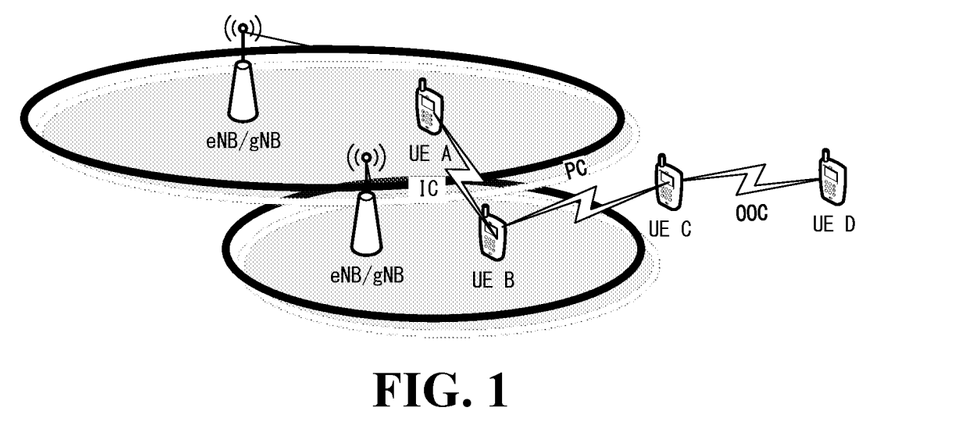
FIG. 1 is a schematic structural diagram illustrating a method for carrier communication according to a related technical solution.

Device-to-Device (D2D) refers to a communication technology that user equipment (UE) can communicate directly with each other without transmitting or forwarding through a device such as a base station. D2D can be deployed within and/or outside cellular network coverage. The 3rd Generation Partnership Project (3GPP) Rel-13 defines a D2D communication mechanism for Public-Safety Service (PS), taking into account different scenarios including in network coverage, partial network coverage, and outside network coverage scenarios. Unlike uplink (UL) or downlink (DL) carrier aggregation (CA), D2D CA does not require a base station in user plane. 3GPP Rel-14 defines D2D-based Vehicle to Everything (V2X) mechanism, and supports cross-carrier V2X communication. However, as shown in FIG. 1, the existing D2D communication mechanisms defined in Rel-13 and Rel-14 are not specifically designed for operation requirements of D2D in multi-carrier scenarios, and the D2D, whether single-carrier D2D or cross-carrier D2D, is performed based on one carrier. Particularly, the carrier set selection requirement for D2D communication performed in CA mode on multiple carriers is not considered.

SUMMARY

Implementations of the present disclosure provide a method for selecting a carrier set for device-to-device (D2D) multi-carrier aggregation and related devices.

According to a first aspect of the present disclosure, a method for selecting a carrier set for D2D multi-carrier aggregation is provided. The method includes the following. A base station receives reporting information from a terminal. The reporting information includes multiple carriers measured as meeting a reporting condition by the terminal. The base station selects, according to resource status of the multiple carriers, a carrier set for CA used for D2D communication of the terminal.

According to a second aspect of the present disclosure, a method for selecting a carrier set for D2D CA is provided. The method includes the following. A terminal sends reporting information including multiple carriers measured as meeting a reporting condition by the terminal to a base station, whereby the base station selects, according to resource status of the multiple carriers, a carrier set for CA used for D2D communication of the terminal.

According to a third aspect of the present disclosure, a base station is provided. The base station includes an information receiving module and a carrier selecting module. The information receiving module is configured to receive reporting information from a terminal, where the reporting information includes multiple carriers measured as meeting a reporting condition by the terminal. The carrier selecting module is configured to select, according to resource status of the multiple carriers, a carrier set for CA used for D2D communication of the terminal.

In the implementations of the present disclosure, the base station first receives the reporting information from the terminal, where the reporting information includes the multiple carriers measured as meeting the reporting condition by the terminal. Then, the base station selects, according to resource status of the multiple carriers, the carrier set for CA used for the D2D communication of the terminal.

BRIEF DESCRIPTION OF DRAWINGS

To describe technical solutions in implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

As stated above, the existing D2D communication mechanisms defined in Rel-13 and Rel-14 are not specifically designed for operation requirements of D2D in multi-carrier scenarios, and the D2D, whether single-carrier D2D or cross-carrier D2D, is performed based on one carrier. Accordingly, implementations of the disclosure take into account D2D communication in multi-carrier scenarios. A base station first receives reporting information from a terminal, where the reporting information includes multiple carriers determined to meet the reporting condition after measured by the terminal. Then the base station selects, according to resource status of the multiple carriers, a carrier set for CA used for the terminal to perform D2D communication. In this way, selecting a carrier set when D2D communication is performed on multiple carriers in a CA mode can be achieved, and communication quality can be improved.

Figure 2:
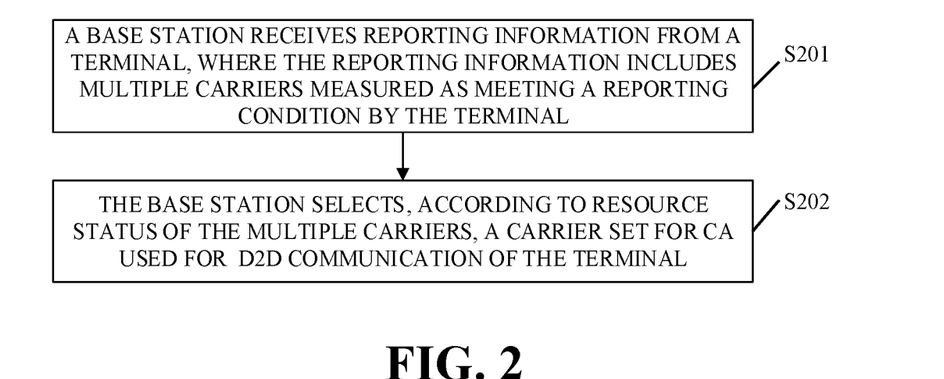
FIG. 2 is a flowchart of a method for selecting a carrier set for D2D multi-carrier aggregation according to an implementation of the present disclosure.

Referring to FIG. 2, FIG. 2 is a flowchart of a method for selecting a carrier set for D2D multi-carrier aggregation according to an implementation of the present disclosure. The method can be performed by a base station. As shown, the method includes the following.

At S201, a base station receives reporting information from a terminal, where the reporting information includes multiple carriers measured as meeting a reporting condition by the terminal.

In an implementation, the terminal may first send a D2D communication request to the base station. The communication request may include expected frequency point information. If the terminal can support CA in broadcast mode or CA in unicast mode, the communication request may also include an indication of support for CA in broadcast mode or an indication of support for CA in unicast mode. Then, after receiving the communication request, the base station configures carrier frequency information for carrier set measurement and reporting condition, which is applicable to a user equipment (UE) in an idle state and/or a connected state. The carrier frequency information is used to indicate a range in which the terminal measures carrier frequency, including a carrier frequency measurement object in unicast mode or/and a carrier frequency measurement object in broadcast mode. The reporting condition may include a threshold for an instantaneous signal, a threshold for a weighted average of a measured signal during a period of time, and the like. It should be noted that the lower the threshold is, the more suitable it is to transmit D2D CA data. Therefore, the carrier for which the measurement is above a certain threshold can be filtered out. Then, the base station sends carrier frequency information pre-configured for the carrier set measurement and the reporting condition to the terminal. As an example, the base station can broadcast, through a system information block (SIB), the D2D carrier frequency information within a certain area and a reporting threshold for each carrier frequency. Finally, after receiving the carrier frequency information for the carrier set measurement and the reporting condition, the terminal determines the multiple carriers that meet the reporting condition in the carrier frequency information, and reports the multiple carriers that meet the reporting condition to the base station.

In an implementation, the terminal may pre-configure the carrier frequency information for the carrier set measurement and the reporting condition. The carrier frequency information includes an available D2D carrier frequency that is location-dependent. When the terminal requires D2D communication, the terminal determines the multiple carriers that meet the reporting condition in the carrier frequency information for the carrier set measurement pre-configured in the terminal, and reports the multiple carriers that meet the reporting condition to the base station.

It should be noted that if the base station has broadcasted the carrier frequency information pre-configured for the carrier set measurement, the carrier frequency information broadcasted by the base station is preferentially selected for measurement. If the base station has not broadcasted the carrier frequency information pre-configured for the carrier set measurement, the carrier frequency information configured by the terminal itself may be selected for measurement.

At S202, the base station selects, according to resource status of the multiple carriers, a carrier set for CA used for D2D communication of the terminal.

In an implementation, the resource status may include usage of the carrier, a geographic location of the terminal, and the like. A carrier set for D2D CA contains available carriers configured for both transmitting and receiving UEs to communicate with each other. The carrier set may include connection-oriented CA in unicast mode and/or connectionless-oriented CA in broadcast mode. If the terminal supports CA in broadcast mode, the terminal may select connectionless-oriented CA in broadcast mode. If the terminal supports CA in unicast mode, the terminal may select connection-oriented CA in unicast mode.

For the connection-oriented CA in unicast mode, the base station may acquire pairing information for D2D communication of the terminal. According to the pairing information, the base station selects the carrier set used for D2D communication pairing at the terminal. In one implementation, the base station may determine the pairing information for the D2D communication of the terminal according to a geographic location of the terminal or a result of D2D discovery by the terminal.

For the connectionless-oriented CA in broadcast mode, the base station does not require pairing for the D2D communication. A transmitting terminal may broadcast data on multiple carriers allocated by the base station, without directing to a certain receiving terminal. The receiving terminal is required to monitor data on multiple carriers allocated by the base station. This approach has the least impact on standardization, but there is a limitation that for a dedicated carrier frequency that is most suitable for D2D communication, if there is a downlink (DL) or uplink (UL) service on the carrier frequency, it is not suitable to communicate in this way.

In an implementation, after the base station selects, according to the resource status of the multiple carriers, the carrier set for CA used for the D2D communication of the terminal, the base station may send indication information to the terminal. The indication information includes the carrier set selected. After receiving the indication information, the terminal may schedule data on the carrier set selected for D2D communication pairing. Alternatively, the terminal may broadcast the data on the carrier set selected.

It should be noted that after D2D CA communication starts, the terminal does not schedule data on all the carriers allocated by the base station each time, but selects part of the carriers allocated by the base station to schedule data.

In implementations of the present disclosure, the base station receives the reporting information from the terminal, where the reporting information includes the multiple carriers determined to meet the reporting condition after measured by the terminal. Then the base station selects, according to the resource status of the multiple carriers, the carrier set for CA used for D2D communication of the terminal. In this way, selecting a carrier set when D2D communication is performed on multiple carriers in a CA mode can be achieved, and communication quality can be improved.

Figure 3:
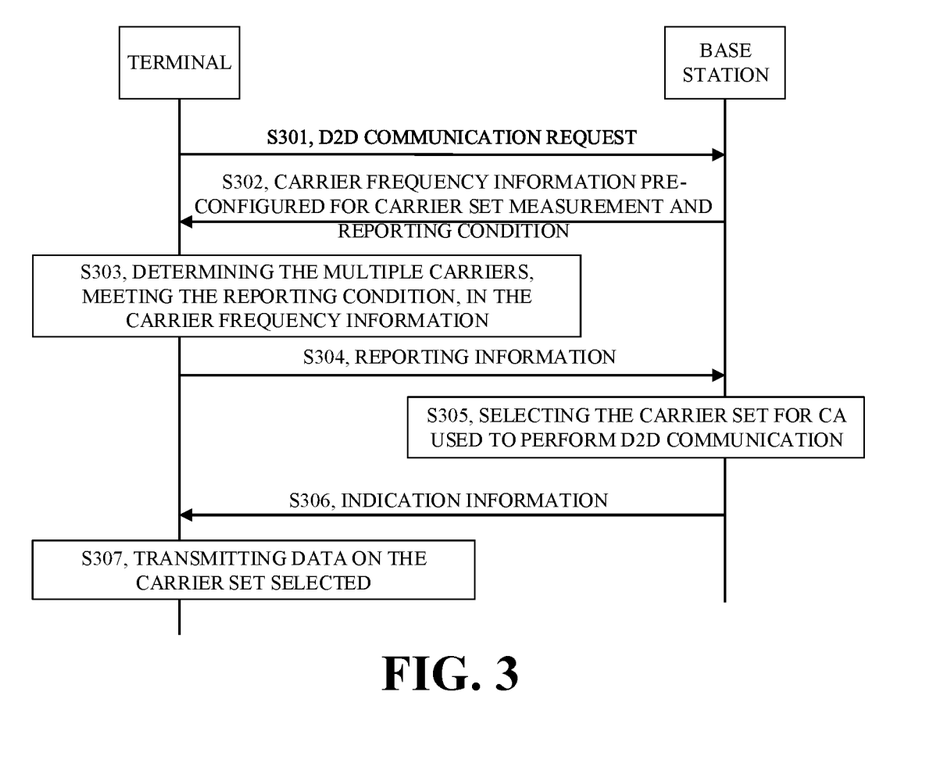
FIG. 3 is a flowchart of a method for selecting a carrier set for D2D multi-carrier aggregation according to another implementation of the present disclosure.

Referring to FIG. 3, FIG. 3 is a flowchart of a method for selecting a carrier set for D2D multi-carrier aggregation according to another implementation of the present disclosure. As shown, the method including the following.

At S301, the terminal sends a D2D communication request to the base station. The communication request includes expected frequency point information. If the terminal can support CA in broadcast mode or CA in unicast mode, the communication request may also include an indication of support for CA in broadcast mode or an indication of support for CA in unicast mode.

At S302, the base station sends carrier frequency information pre-configured for carrier set measurement and the reporting condition to the terminal.

In an implementation, after receiving the communication request, the base station configures carrier frequency information for carrier set measurement and reporting condition, which is applicable to a user equipment (UE) in an idle state and/or a connected state. The carrier frequency information is used to indicate a range in which the terminal measures carrier frequency, including a carrier frequency measurement object in unicast mode or/and a carrier frequency measurement object in broadcast mode. The reporting condition may include a threshold for an instantaneous signal, a threshold for a weighted average of a measured signal during a period of time, and the like. It should be noted that the lower the threshold is, the more suitable it is to transmit D2D CA data. Therefore, the carrier for which the measurement is above a certain threshold can be filtered out. Then, the base station sends carrier frequency information pre-configured for the carrier set measurement and the reporting condition to the terminal.

Moreover, the base station can broadcast, through a system information block (SIB), the D2D carrier frequency information within a certain area and a reporting threshold for each carrier frequency.

At S303, the terminal determines the multiple carriers, meeting the reporting condition, in the carrier frequency information.

In an implementation, the terminal may pre-configure the carrier frequency information for the carrier set measurement and the reporting condition. The carrier frequency information includes an available D2D carrier frequency that is location-dependent. When the terminal requires D2D communication, the terminal determines the multiple carriers that meet the reporting condition in the carrier frequency information for the carrier set measurement pre-configured in the terminal.

It should be noted that if the base station has broadcasted the carrier frequency information pre-configured for the carrier set measurement, the carrier frequency information broadcasted by the base station is preferentially selected for measurement. If the base station has not broadcasted the carrier frequency information pre-configured for the carrier set measurement, the carrier frequency information configured by the terminal itself may be selected for measurement.

At S304, the terminal sends reporting information including multiple carriers measured as meeting a reporting condition by the terminal to the base station.

At S305, according to resource status of the multiple carriers, the base station selects the carrier set for CA used for D2D communication of the terminal.

In an implementation, the resource status may include usage of the carrier, a geographic location of the terminal, and the like. A carrier set for D2D CA contains available carriers configured for both transmitting and receiving UEs to communicate with each other. The carrier set may include connection-oriented CA in unicast mode and/or connectionless-oriented CA in broadcast mode. If the terminal supports CA in broadcast mode, the terminal may select connectionless-oriented CA in broadcast mode. If the terminal supports CA in unicast mode, the terminal may select connection-oriented CA in unicast mode.

For the connection-oriented CA in unicast mode, the base station may acquire pairing information for D2D communication of the terminal. According to the pairing information, the base station selects the carrier set used for D2D communication pairing at the terminal. In one implementation, the base station may determine the pairing information for the D2D communication of the terminal according to a geographic location of the terminal or a result of D2D discovery by the terminal.

For the connectionless-oriented CA in broadcast mode, the base station does not require pairing for the D2D communication. A transmitting terminal may broadcast data on multiple carriers allocated by the base station, without directing to a certain receiving terminal. The receiving terminal is required to monitor data on multiple carriers allocated by the base station. This approach has the least impact on standardization, but there is a limitation that for a dedicated carrier frequency that is most suitable for D2D communication, if there is a downlink (DL) or uplink (UL) service on the carrier frequency, it is not suitable to communicate in this way.

At S306, the base station sends indication information to the terminal, where the indication information includes the carrier set selected.

At S307, the terminal transmits data on the carrier set selected.

In an implementation, the terminal may schedules data on the carrier set selected for D2D communication pairing; or broadcasts the data on the carrier set selected.

Figure 4:
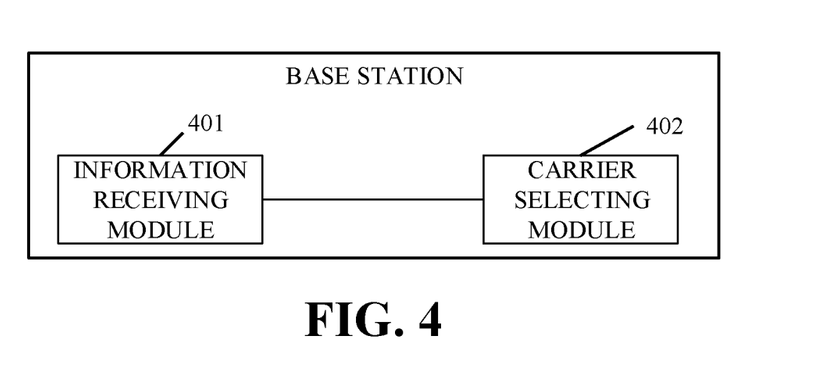
FIG. 4 is a schematic structural diagram illustrating a base station according to an implementation of the present disclosure.

Referring to FIG. 4, FIG. 4 is a schematic structural diagram illustrating a base station according to an implementation of the present disclosure. As shown, the base station includes an information receiving module 401 and a carrier selecting module 402.

The information receiving module 401 is configured to receive reporting information from a terminal, where the reporting information includes multiple carriers measured as meeting a reporting condition by the terminal.

In an implementation, the terminal may first send a D2D communication request to the base station. The communication request may include expected frequency point information. If the terminal can support CA in broadcast mode or CA in unicast mode, the communication request may also include an indication of support for CA in broadcast mode or an indication of support for CA in unicast mode. Then, after receiving the communication request, the base station configures carrier frequency information for carrier set measurement and reporting condition, which is applicable to a user equipment (UE) in an idle state and/or a connected state. The carrier frequency information is used to indicate a range in which the terminal measures carrier frequency, including a carrier frequency measurement object in unicast mode or/and a carrier frequency measurement object in broadcast mode. The reporting condition may include a threshold for an instantaneous signal, a threshold for a weighted average of a measured signal during a period of time, and the like. It should be noted that the lower the threshold is, the more suitable it is to transmit D2D CA data. Therefore, the carrier for which the measurement is above a certain threshold can be filtered out. Then, the base station sends carrier frequency information pre-configured for the carrier set measurement and the reporting condition to the terminal. As an example, the base station can broadcast, through a system information block (SIB), the D2D carrier frequency information within a certain area and a reporting threshold for each carrier frequency. Finally, after receiving the carrier frequency information for the carrier set measurement and the reporting condition, the terminal determines the multiple carriers that meet the reporting condition in the carrier frequency information, and reports the multiple carriers that meet the reporting condition to the base station.

In an implementation, the terminal may pre-configure the carrier frequency information for the carrier set measurement and the reporting condition. The carrier frequency information includes an available D2D carrier frequency that is location-dependent. When the terminal requires D2D communication, the terminal determines the multiple carriers that meet the reporting condition in the carrier frequency information for the carrier set measurement pre-configured in the terminal, and reports the multiple carriers that meet the reporting condition to the base station.

It should be noted that if the base station has broadcasted the carrier frequency information pre-configured for the carrier set measurement, the carrier frequency information broadcasted by the base station is preferentially selected for measurement. If the base station has not broadcasted the carrier frequency information pre-configured for the carrier set measurement, the carrier frequency information configured by the terminal itself may be selected for measurement.

The carrier selecting module 402 is configured to select, according to resource status of the multiple carriers, a carrier set for CA used for D2D communication of the terminal.

In an implementation, the resource status may include usage of the carrier, a geographic location of the terminal, and the like. A carrier set for D2D CA contains available carriers configured for both transmitting and receiving UEs to communicate with each other. The carrier set may include connection-oriented CA in unicast mode and/or connectionless-oriented CA in broadcast mode. If the terminal supports CA in broadcast mode, the terminal may select connectionless-oriented CA in broadcast mode. If the terminal supports CA in unicast mode, the terminal may select connection-oriented CA in unicast mode.

For the connection-oriented CA in unicast mode, the base station may acquire pairing information for D2D communication of the terminal. According to the pairing information, the base station selects the carrier set used for D2D communication pairing at the terminal. In one implementation, the base station may determine the pairing information for the D2D communication of the terminal according to a geographic location of the terminal or a result of D2D discovery by the terminal.

For the connectionless-oriented CA in broadcast mode, the base station does not require pairing for the D2D communication. A transmitting terminal may broadcast data on multiple carriers allocated by the base station, without directing to a certain receiving terminal. The receiving terminal is required to monitor data on multiple carriers allocated by the base station. This approach has the least impact on standardization, but there is a limitation that for a dedicated carrier frequency that is most suitable for D2D communication, if there is a downlink (DL) or uplink (UL) service on the carrier frequency, it is not suitable to communicate in this way.

In an implementation, after the base station selects, according to the resource status of the multiple carriers, the carrier set for CA used for the D2D communication of the terminal, the base station may send indication information to the terminal. The indication information includes the carrier set selected. After receiving the indication information, the terminal may schedule data on the carrier set selected for D2D communication pairing. Alternatively, the terminal may broadcast the data on the carrier set selected.

It should be noted that after D2D CA communication starts, the terminal does not schedule data on all the carriers allocated by the base station each time, but selects part of the carriers allocated by the base station to schedule data.

Figure 5:
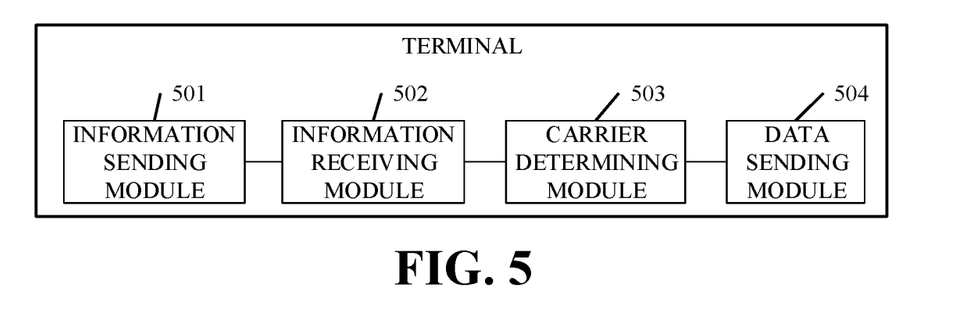
FIG. 5 is a schematic structural diagram illustrating a terminal according to an implementation of the present disclosure.

Referring to FIG. 5, FIG. 5 is a schematic structural diagram illustrating a terminal according to an implementation of the present disclosure. As shown, the terminal includes an information sending module 501.

The information sending module 501 is configured to send reporting information to a base station, where the reporting information includes multiple carriers measured as meeting a reporting condition by the terminal. According to resource status of the multiple carriers, the base station selects a carrier set for CA used for D2D communication of the terminal.

In an implementation, the information sending module 501 is further configured to send a D2D communication request to the base station.

In an implementation, as shown in FIG. 5, the terminal further includes an information receiving module 502 and a carrier determining module 503.

The information receiving module 502 is configured to receive carrier frequency information pre-configured for carrier set measurement and a reporting condition from the base station;

The carrier determining module 503 is configured to determine the multiple carriers in the carrier frequency information meeting the reporting condition.

The carrier determining module 503 is further configured to determine multiple carriers that meet the reporting condition pre-configured in the terminal for a carrier set measurement.

In one example, the carrier set includes connection-oriented CA in unicast mode and/or connectionless-oriented CA in broadcast mode.

In an implementation. the information receiving module 502 is configured to receive indication information from the base station, where the indication information includes the carrier set selected.

In an implementation, as shown in FIG. 5, the terminal further includes a data sending module 504.

The data sending module 504 is configured to schedule data on the carrier set selected for D2D communication pairing or to broadcast the data on the carrier set selected.

It should be noted that the implementation of each module may also perform the method and function performed by the terminal in the foregoing implementation, with reference to the corresponding descriptions of the method embodiments illustrated in FIG. 2 and FIG. 3, which is not repeated herein.

Figure 6:
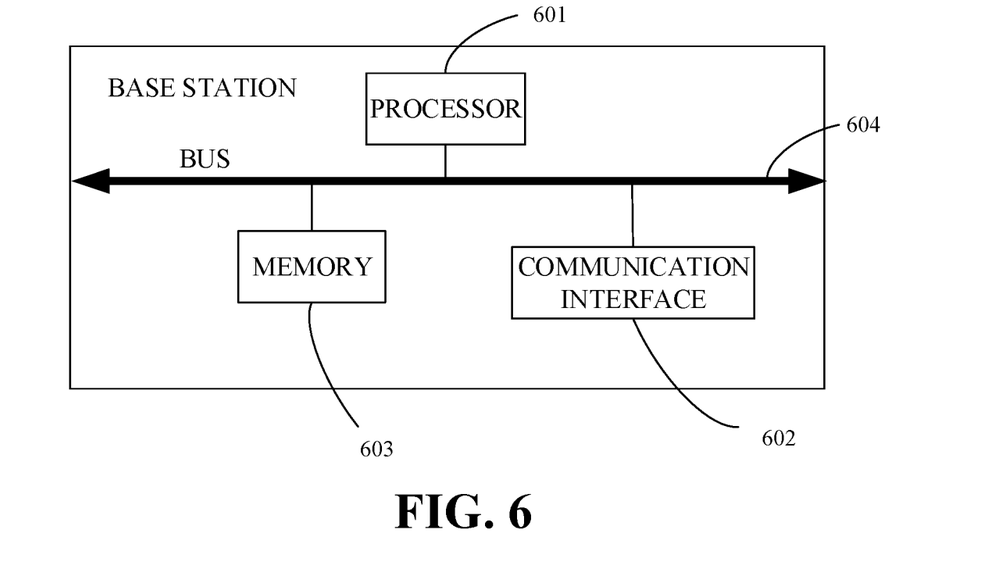
FIG. 6 is a schematic structural diagram illustrating a base station according to another implementation of the present disclosure.

Referring to FIG. 6, FIG. 6 is a structural diagram illustrating a base station according to another implementation of the present disclosure. As shown, the base station may include at least one processor 601 such as a CPU, at least one communication interface 602, at least one memory 603, and at least one bus 604. The bus 604 is configured to implement connection and communication between the components. The communication interface 602 of the base station in the implementation of the present disclosure may be a wired transmit port, or may be a wireless device, for example, including an antenna apparatus. The communication interface 602 is configured to communicate signaling or data with other node devices. The memory 603 may be a high-speed RAM memory, or a non-volatile memory (NVM), such as, at least one magnetic disk storage. Alternatively, the memory 603 may be at least one storage apparatus that is located far away from the processor 601. The memory 603 stores a set of program codes, and the processor 601 is configured to invoke the program codes stored in the memory to execute the following operations including: receiving reporting information from a terminal, where the reporting information includes multiple carriers measured as meeting a reporting condition by the terminal; selecting, according to resource status of the multiple carriers, a carrier set for CA used for D2D communication of the terminal.

The processor 601 is further configured to execute the following operations including: receiving a D2D communication request from the terminal; sending carrier frequency information pre-configured for carrier set measurement and the reporting condition to the terminal according to the D2D communication request.

In one example, the carrier set includes connection-oriented CA in unicast mode and/or connectionless-oriented CA in broadcast mode.

In an implementation, the processor 601 is further configured to execute the following operations including: acquiring pairing information for the D2D communication of the terminal; selecting the carrier set used for D2D communication pairing at the terminal according to the pairing information.

In an implementation, the processor 601 is further configured to execute the following operations including: determining the pairing information for the D2D communication of the terminal according to a geographic location of the terminal or a result of D2D discovery by the terminal.

In an implementation, the processor 601 is further configured to execute the following operations including: sending indication information to the terminal, where the indication information includes the carrier set selected.

It should be noted that, for brief description, the foregoing method implementations are presented as a series of actions. However, a person skilled in the art should appreciate that the present disclosure is not limited to the described order of the actions, because according to implementations of the present disclosure, some steps may be performed in other orders or simultaneously. In addition, a person skilled in the art should also appreciate that all the implementations described in the specification are examples of implementations, and the related actions and modules are not necessarily mandatory to implementations of the present disclosure.

In the foregoing implementations, the description of each implementation has respective focuses. For a part that is not described in detail in an implementation, reference may be made to related descriptions in other implementations.

Persons of ordinary skill in the art may understand that all or some of the steps of the methods in the implementations may be implemented by a program instructing relevant hardware. The program may be stored in a computer readable storage medium. The storage medium may include a flash memory, a read-only memory (ROM), a random access memory (RAM), a magnetic disk, an optical disc, or the like.

A method for selecting a carrier set for D2D multi-carrier aggregation provided in the implementations of the present disclosure are described in detail above. The principle and implementation of the present disclosure are described herein through specific examples. The description about the implementations of the present disclosure is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A method for selecting a carrier set for device-to-device (D2D) multi-carrier aggregation, comprising:
   receiving, by a base station, reporting information from a terminal, the reporting information comprising a plurality of carriers measured as meeting a reporting condition by the terminal; and
   selecting, by the base station, according to resource status of the plurality of carriers, a carrier set for carrier aggregation used for D2D communication of the terminal.

2. The method of claim 1, wherein the method further comprises:
   before receiving, by the base station, the reporting information from the terminal:
   receiving, by the base station, a D2D communication request from the terminal; and
   sending, by the base station, according to the D2D communication request, carrier frequency information pre-configured for carrier set measurement and the reporting condition to the terminal.

3. The method of claim 1, wherein selecting, by the base station, according to the resource status of the plurality of carriers, the carrier set for carrier aggregation used for D2D communication of the terminal comprises:
   acquiring, by the base station, pairing information for the D2D communication of the terminal; and
   selecting, by the base station, according to the pairing information, the carrier set for carrier aggregation used for D2D communication pairing at the terminal.

4. The method of claim 3, wherein acquiring, by the base station, the pairing information for the D2D communication of the terminal comprises:
   determining, by the base station, the pairing information for the D2D communication of the terminal according to a geographic location of the terminal or a result of D2D discovery by the terminal.

5. The method of claim 1, wherein the method further comprises:
   after selecting, by the base station, according to the resource status of the plurality of carriers, the carrier set for carrier aggregation used for the D2D communication of the terminal,
   sending, by the base station, indication information to the terminal, the indication information comprising the carrier set selected.

6. The method of claim 1, wherein the resource status comprises a geographic location of the user equipment.

7. A method for selecting a carrier set for device-to-device (D2D) carrier aggregation, comprising:
   sending, by a terminal, reporting information comprising a plurality of carriers measured as meeting a reporting condition by the terminal to a base station, whereby the base station selects, according to resource status of the plurality of carriers, a carrier set for carrier aggregation used for D2D communication of the terminal.

8. The method of claim 7, wherein the method further comprises:
   before sending, by the terminal, the reporting information to the base station:
   sending, by the terminal, a D2D communication request to the base station;
   receiving, by the terminal, carrier frequency information pre-configured for carrier set measurement and the reporting condition from the base station; and determining, by the terminal, the plurality of carriers in the carrier frequency information meeting the reporting condition.

9. The method of claim 7, wherein the method further comprises:
before sending, by the terminal, the reporting information to the base station,
determining, by the terminal, the plurality of carriers, meeting the reporting condition, in carrier frequency information pre-configured in the terminal for carrier set measurement.

10. The method of claim 7, wherein the method further comprises:
after sending, by the terminal, the reporting information to the base station,
receiving, by the terminal, indication information from the base station, the indication information comprising the carrier set selected.

11. The method of claim 10, wherein the method further comprises:
after receiving, by the terminal, the indication information from the base station:
scheduling, by the terminal, data on the carrier set selected for D2D communication pairing; or
broadcasting, by the terminal, the data on the carrier set selected.

12. The method of claim 7, wherein the reporting condition is received from base station prior to measuring the plurality of carriers.

13. The method of claim 7, wherein the reporting condition is selected by the user equipment for measurement.

14. The method of claim 7, wherein when the user equipment has previously received pre-configured carrier frequency information broadcasted by the base station, the pre-configured carrier frequency information is used to measure the plurality of carriers; and when the user equipment has not previously received the pre-configured carrier frequency information from the base station, carrier frequency information configured by the user equipment is used to measure the plurality of carriers.

15. The method of claim 7, wherein the user equipment does not schedule data on all carriers in the carrier set each time after D2D communication begins.

16. A base station, comprising:
at least one processor; and
a computer readable storage, coupled with the at least one processor and storing at least one computer executable instruction therein which, when executed by the at least one processor, causes the at least one processor to:
receive reporting information from a terminal, the reporting information comprising a plurality of carriers measured as meeting a reporting condition by the terminal; and
select, according to resource status of the plurality of carriers, a carrier set for carrier aggregation used for device-to-device (D2D) communication of the terminal.

17. The base station of claim 16, wherein the at least one computer executable instruction when executed by the at least one processor further causes the at least one processor to:
receive a D2D communication request from the terminal; and
send, according to the D2D communication request, carrier frequency information pre-configured for carrier set measurement and the reporting condition to the terminal.

18. The base station of claim 16, wherein the at least one computer executable instruction when executed by the at least one processor further causes the at least one processor to:
acquire pairing information for D2D communication of the terminal; and
select, according to the pairing information, the carrier set for carrier aggregation used for D2D communication pairing at the terminal.

19. The base station of claim 18, wherein the at least one computer executable instruction when executed by the at least one processor further causes the at least one processor to determine, by the base station, the pairing information for the D2D communication of the terminal according to a geographic location of the terminal or a result of D2D discovery of the terminal.

20. The base station of claim 16, wherein the at least one computer executable instruction when executed by the at least one processor further causes the at least one processor to send, by the base station, indication information to the terminal, the indication information comprising the carrier set selected.

* * * * *

UNITED STATES PATENT AND TRADEMARK OFFICE
CERTIFICATE OF CORRECTION

PATENT NO. : 11,039,439 B2
APPLICATION NO. : 16/662860
DATED : June 15, 2021
INVENTOR(S) : Lei et al.

Page 1 of 1

It is certified that error appears in the above-identified patent and that said Letters Patent is hereby corrected as shown below:

In the Claims

In Claim 1, at Column 10, Line 8, insert --a-- after "according to".
In Claim 7, at Column 10, Line 53, insert --,-- after "terminal".
In Claim 7, at Column 10, Line 54, insert --a-- after "according to".
In Claim 16, at Column 12, Line 9, insert --a-- after "according to".

Signed and Sealed this
Twenty-eighth Day of January, 2025

Coke Morgan Stewart
*Acting Director of the United States Patent and Trademark Office*